United States Patent
Wang

(10) Patent No.: US 11,616,924 B2
(45) Date of Patent: Mar. 28, 2023

(54) CMOS IMAGE SENSOR WITH IMAGE BLACK LEVEL COMPENSATION AND METHOD

(71) Applicant: SmartSens Technology (HK) Co., Ltd., Kwun Tong Kowloon (HK)

(72) Inventor: Xiaoyong Wang, Shanghai (CN)

(73) Assignee: SmartSens Technology (HK) Co., Ltd., Kowloon (HK)

(*) Notice: Subject to any disclaimer, the term of this patent is extended or adjusted under 35 U.S.C. 154(b) by 0 days.

(21) Appl. No.: 17/385,792

(22) Filed: Jul. 26, 2021

(65) Prior Publication Data
US 2022/0141407 A1 May 5, 2022

Related U.S. Application Data

(63) Continuation-in-part of application No. 17/140,404, filed on Jan. 4, 2021, now Pat. No. 11,336,846.

(30) Foreign Application Priority Data

Oct. 30, 2020 (CN) .......................... 202011195824.0
Jun. 29, 2021 (CN) .......................... 202110732677.4

(51) Int. Cl.
*H04N 5/365* (2011.01)
*H04N 5/374* (2011.01)

(52) U.S. Cl.
CPC ........... *H04N 5/3655* (2013.01); *H04N 5/374* (2013.01)

(58) Field of Classification Search
CPC ..... H04N 5/355; H04N 5/36963; H04N 5/374
USPC ........................................................ 348/308
See application file for complete search history.

(56) References Cited

U.S. PATENT DOCUMENTS

| | | | | |
|---|---|---|---|---|
| 2009/0103829 A1* | 4/2009 | Takahashi | ................ | H04N 9/09 382/260 |
| 2013/0182170 A1* | 7/2013 | Suzuki | ................... | H04N 5/361 348/340 |
| 2015/0304578 A1* | 10/2015 | Okura | .................... | H04N 5/374 348/308 |
| 2021/0192185 A1* | 6/2021 | Lin | ....................... | G06V 40/167 |

* cited by examiner

*Primary Examiner* — Lin Ye
*Assistant Examiner* — Chan T Nguyen
(74) *Attorney, Agent, or Firm* — Eric Karich; Karich & Associates

(57) ABSTRACT

An image sensor has an image sensor array and circuit design employing a method of black level compensation to address image shading related to global exposure image capture and rolling row by row readout schemes. An image sensor including the invented black level compensation pixel array and method may be incorporated within a digital camera.

17 Claims, 5 Drawing Sheets

CMOS IMAGE SENSOR WITH IMAGE BLACK LEVEL COMPENSATION AND METHOD

CROSS-REFERENCE TO RELATED APPLICATIONS

This application for a utility patent claims the benefit of U.S. Utility application Ser. No. 17/140,404, filed Jan. 4, 2021.

BACKGROUND OF THE INVENTION

Field of the Invention:

This invention relates generally to image sensors, and more particularly to CMOS image sensors. The present invention provides an image sensor array and circuit design employing two-dimensional black level compensation to reduce image display shading. An image sensor comprising the invented black level compensation pixel array and method may be incorporated within a digital camera.

Description of Related Art:

An image capture device includes an image sensor and an imaging lens. The imaging lens focuses light onto the image sensor to form an image, and the image sensor converts the light into electrical signals. The imaging lens is almost always circular in shape and casts a focused image that is circular in shape onto the plane of the image sensor. The image focus circle circumscribes the active array of imaging pixels. Since imaging formats are typically rectangular and must support both 4:3 aspect ratio still image capture as well as 16:9 aspect ratio video capture the circular shape of the focused image presents at least four corner regions into which the two rectangular imaging formats do not extend. The electric signals are output from the image capture device to other components of a host electronic system. The image capture device and the other components of a host electronic system form an imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array in rows and columns. Such an image sensor may be configured to produce a color image by forming a color filter array (CFA) over the pixels. The technology used to manufacture image sensors, Complementary Metal-Oxide-Semiconductor ("CMOS") image sensors ("CIS"), may generate inaccurate image data due to dark current in the pixels themselves and variation in the level of dark current from pixel to pixel. Each pixel of a CIS array provides an output voltage that varies as a function of the light incident on the pixel. Unfortunately, dark currents add to the output voltages and degrade the picture provided by the imaging system. To generate accurate image data, it is desirable to estimate dark current and level correct for it resulting in black level compensation.

Two of the most common methods for reading off the image signals generated on a sensor chip are the rolling shutter mode and the global shutter mode. The rolling shutter mode involves exposing different lines of the sensor array at different times and reading out those lines in a chosen sequence. The global shutter mode involves exposing each pixel simultaneously and for the same length of time similar to how a mechanical shutter operates on a legacy "snapshot" camera. Prior art digital imaging systems have utilized either rolling shutter or global shutter readout modes. There are advantages however to having an imaging system which is capable of both readout modes wherein the readout mode is selectable by the operator.

Rolling shutter (RS) mode exposes and reads out adjacent rows of the array at different times, that is, each row will start and end its exposure slightly offset in time from its neighbor. The readout of each row follows along each row after the exposure has been completed and transfers the charge from each row into the readout node of the pixel. Although each row is subject to the same exposure time, the row at the top will have ended its exposure a certain time prior to the end of the exposure of the bottom row of the sensor. That time depends on the number of rows and the offset in time between adjacent rows. A potential disadvantage of rolling shutter readout mode is spatial distortion which results from the above. The distortion becomes more apparent in cases where larger objects are moving at a rate that is faster than the readout rate. Another disadvantage is that different regions of the exposed image will not be precisely correlated in time and appear as a distortion in the image. To improve signal to noise in the image signal final readout, specifically to reduce temporal dark noise, a reference readout called correlated double sampling (CDS) is performed prior to the conversion of each pixel charge to an output signal by an amplifier transistor. The amplifier transistor may typically be a transistor in a source-follower (SF) configuration.

Global shutter (GS) mode exposes all pixels of the array simultaneously. This facilitates the capture of fast moving events, freezing them in time. Before the exposure begins all the pixels are reset (RST) to the same ostensibly dark level by draining all their charge. At the start of the exposure each pixel begins simultaneously to collect charge and is allowed to do so for the duration of the exposure time. At the end of the exposure each pixel transfers charge simultaneously to its readout node. Global shutter mode can be configured to operate in a continuous manner whereby an exposure can proceed while the previous exposure is being readout from the readout storage nodes of each pixel. In this mode the sensor has 100% duty cycle which optimizes time resolution and photon collection efficiency. There is no artifact in the image of the period of transient readout that occurs in rolling shutter mode. Global shutter can be regarded as essential when exact time correlation is required between different regions of the sensor area. Global shutter is also very simple to synchronize with light sources or other devices.

Global shutter mode demands that a pixel contain at least one more transistor or storage components than a pixel using rolling shutter mode. Those extra components are used to store the image charge for readout during the time period following simultaneous exposure. Again, to improve signal to noise in the image signal a reference readout is required not only to be performed prior to the conversion of each pixel charge to an output signal by an amplifier transistor, but also prior to the transfer of the pixel charge to the extra components of the pixel used to store the image charge during readout.

In summary, rolling shutter can deliver the lowest read noise and is useful for very fast streaming of data without synchronization to light sources or peripheral devices. However, it carries risk of spatial distortion especially when imaging relatively large, fast moving objects.

There is no risk of spatial distortion when using global shutter and when synchronizing to fast switching peripheral devices it is relatively simple and can result in faster frame rates. Flexibility to offer both rolling shutter and global shutter can be very advantageous.

Most image sensors require some form of calibration before use, so that the data obtained from the image sensor can be used to produce digital images that faithfully reproduce the optical characteristics (intensity, color, etc.) of the captured scene or object. Some calibrations can be carried out once and remain valid for every subsequent use of the image sensor, but other calibrations must be carried out for every single use of the image sensor. Black level calibration or compensation is one of the calibrations usually performed for every single use of an image sensor. As its name implies, the purpose of a black level calibration is to determine the black level of the image sensor. The black level calibration effectively sets a threshold below which digital data values obtained from the image sensor will be considered to represent the color black, or in other words, represent the absence or substantial absence of light. The threshold value is then used to adjust the values obtained from other pixels in the array.

Accurate black-level calibration helps to achieve a digital picture with full contrast and subtle details in dark shadow regions. If the black level is too low, information in dark areas may be lost; if the black level is too high, signal range may be sacrificed. However, there are situations where the dark current is not uniform across the pixel array. For example, in global or frame exposure mode, wherein the shutter and integration of a pixel array is done simultaneously across the entire pixel array, the readout is done one row at a time, so there is an integration time difference vertically across the array from the top to the bottom of the pixel array. Non-uniformity of the dark current in frame exposure mode may be one source of vertical and horizontal shading. Other causes of vertical and horizontal shading include temperature gradients, process gradients, and pixel output settling. The present invention addresses both vertical and horizontal shading issues providing an amended pixel array arrangement along with a method to adjust pixel image data to compensate for two-dimensional shading. The present invention also provides further advantages as described in the following summary.

SUMMARY OF THE INVENTION

The present invention teaches certain benefits in construction and use which give rise to the objectives described below.

In a CMOS image sensor, a pixel array is composed of several pixel units, the pixel unit often adopting a three transistor 3T, 4T or 5T structure. The 4T, for example, includes a transfer transistor, a reset transistor, a source follower transistor, and a row select transistor. The pixel unit uses photodiodes to perform photoelectric conversion to form photo-generated carriers and generate analog signals. By gating and reading the rows of the pixel array, the analog signals of each column are read out with subsequent operational gain amplification, analog-to-digital conversion (ADC), etc. comprising the signal processing process. The aforementioned vertical shading across the array from the uppermost rows to those at the bottom may be substantially related to the black or dark current associated with the pixel location. Other causes of vertical and horizontal shading include temperature gradients, process gradients, and pixel output settling. The invention provides an imaging array design allowing for sampling and compensation of this dark current wherein pixels covered with opaque shields are provided at the top and or the bottom of the array. In a related application vertical shading (one dimensional) is addressed by dedicating the topmost and or bottom most rows of the array to this purpose. A topmost row would be the first row of an array and the bottom most row would be the last row of an array. In the instant invention an improved array design provides small arrays of pixels covered with opaque shields at four corners of the imaging array in order to capture two-dimensional shading. A method to adjust the image signal is also provided.

A primary objective of the present invention is to provide an image sensor pixel array design and readout method which has advantages not taught by the prior art and provides for black level compensation to reduce vertical and horizontal shading in a displayed image.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor with improved black level compensation pixel array, and method. Various embodiments of the image sensor with improved black level compensation pixel array and method are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Throughout the specification and claims, the following terms take the meanings explicitly associated herein, unless the context clearly dictates otherwise. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). The term "circuit" means either a single component or a multiplicity of components, either active or passive, that are coupled together to provide a desired function. The term "signal" means at least one current, voltage, or data signal. For purposes of this application, the term "small number" is defined to mean 1-3 rows.

Figure 1:
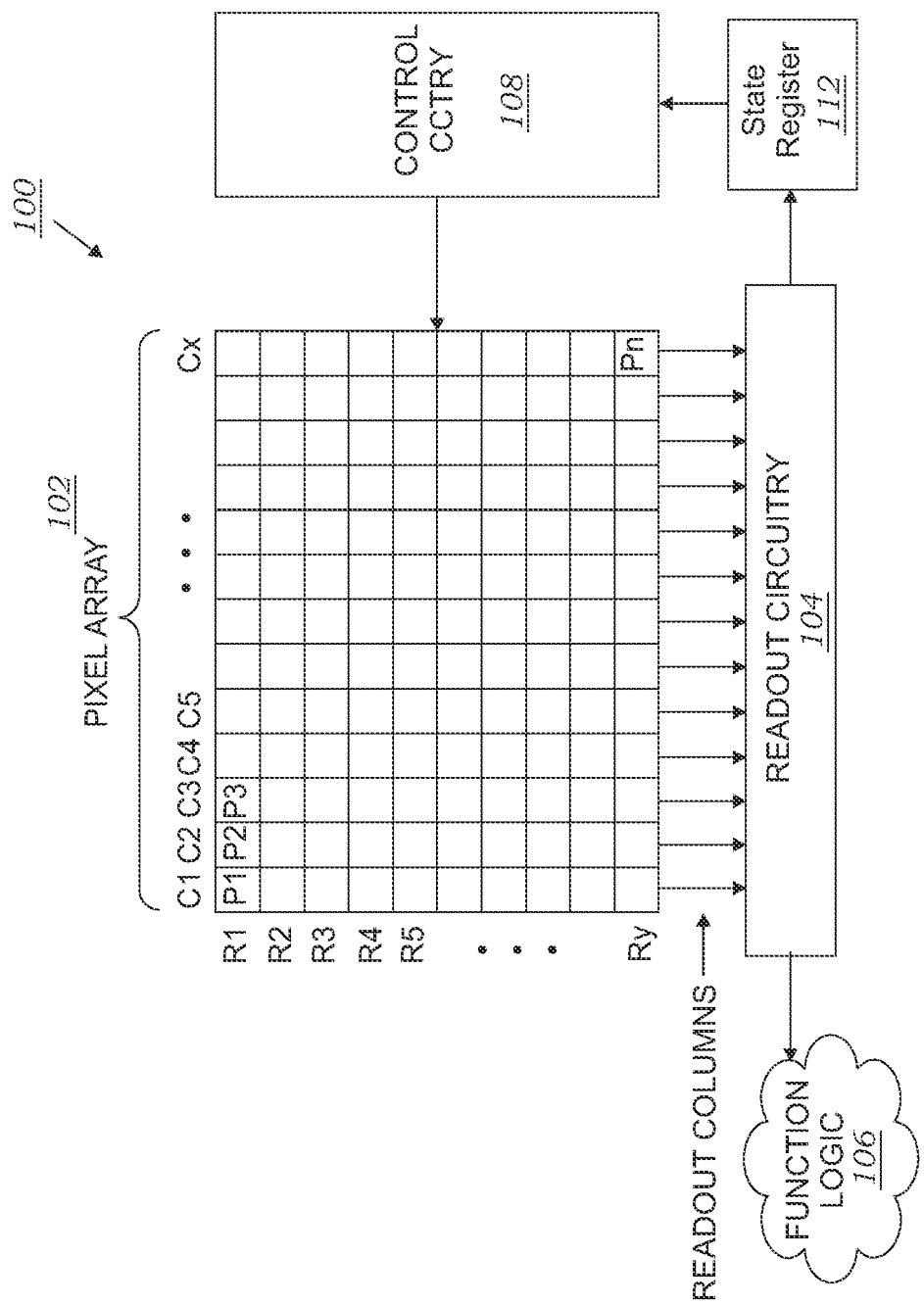
FIG. 1 is a diagram illustrating an imaging system including a pixel cell array having image sensor pixel cells included in an integrated circuit system, according to one or more embodiments of the present invention.

FIG. 1 is a diagram illustrating a first embodiment of an imaging system 100 including an example pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 112. In one example, pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 112 and then transferred to function logic 106. In various examples, readout circuitry 104 may include amplification circuitry, analog-to-digital (ADC) conversion circuitry, or otherwise. State register 112 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated), or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. Readout of a captured image is typically done with rolling shutter methods and a result is that the last row readout lags the first row readout. During that lag time the last row of pixels may have acquired more dark current than was acquired by the first row. The result is shading and other image quality loss effects which the invention seeks to ameliorate.

Figure 2:
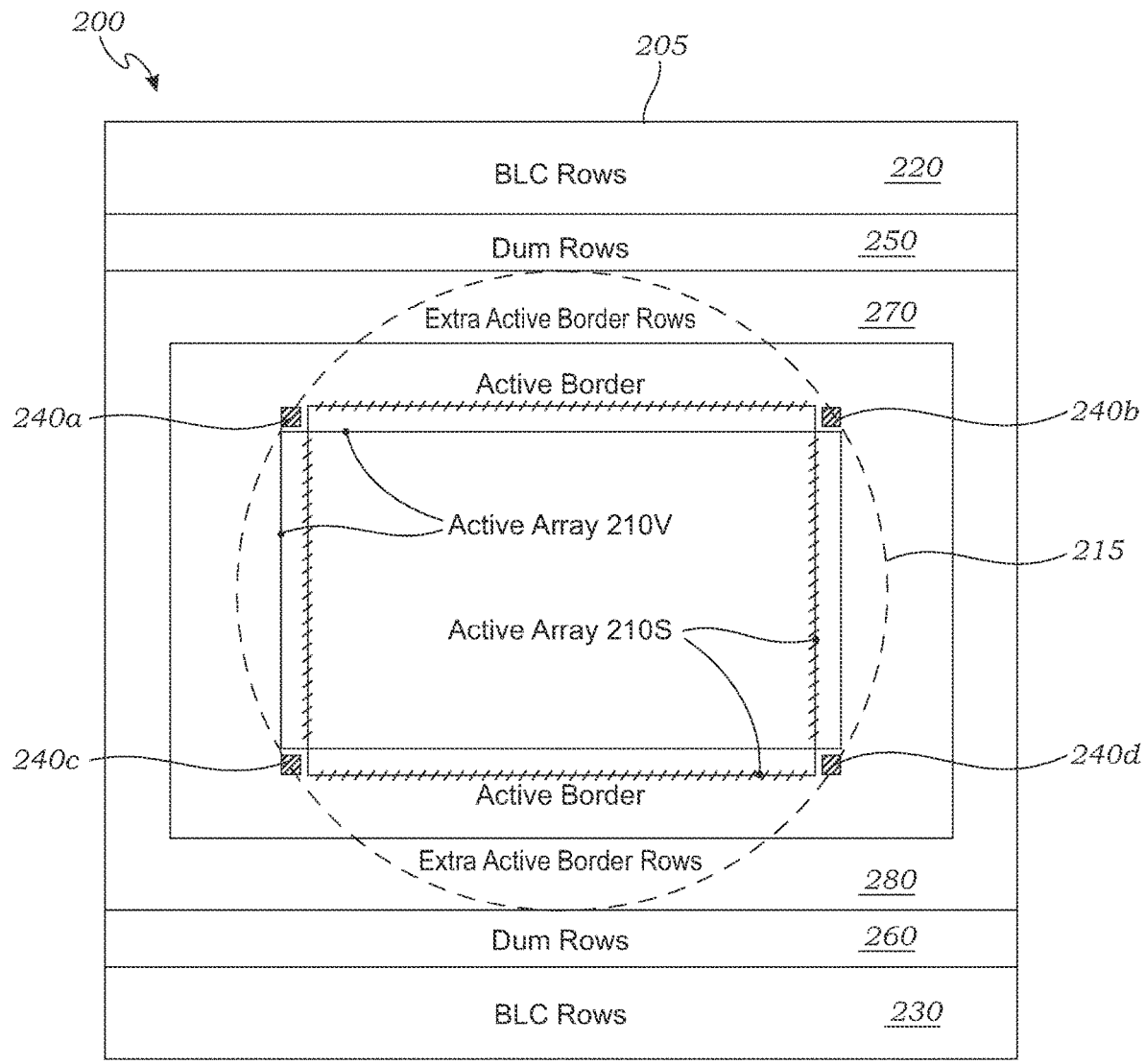
FIG. 2 illustrates an image sensor pixel array design representing one or more embodiments of the invention.

FIG. 2 illustrates an image sensor pixel array design 200 representing one or more embodiments of the invention. Image sensor Master pixel array 205 comprises rows and columns of pixels wherein central imaging arrays of pixels 210s and 210v are utilized to capture images from incident light in either respective still (4:3) and video (16:9) formats. The imaging lens which is almost always circular in shape casts a focused image that is circular in shape onto the plane of the image sensor. The circular boundary of the focused image on master array 205 is shown by circle 215. The width of array 210v determines the width of the active array of pixels available for imaging and the height of array 210s determines the height of the active array of pixels available for imaging while both dimensions and their associated arrays must be circumscribed within circle 215. Black Level Compensation (BLC) rows 220 and 230 are rows Black Level Compensation (BLC) pixels fabricated identically to the pixels of array 210 except that they are covered to prevent any incident light from falling on them. Rows 220 are positioned at the top of master array 205 and above the rows of imaging arrays 210s and 210v. Rows 230 are positioned at the bottom of master array 205. In one embodiment of the invention Rows 220 and 230 consist of two rows of pixels each.

There are four corner regions where pixel sub-arrays 240a, 240b, 240c and 240d may be arranged in four corner regions, but are not included within imaging arrays 210s or 210v. However, some parts of sub-arrays 240 may fall within lens circle of focus 215 and some parts may fall outside the lens circle of focus 215, so that sub-arrays 240a, 240b, 240c and 240 may not be used each readout because of the using of the imaging arrays 210s or 210v. In one or more embodiments of the invention these sub-arrays are designed to be Black Level Compensation (BLC) pixels and are called Black Level Compensation (BLC) corner sub-arrays. In one or more embodiments of the invention the four BLC corner sub-arrays are included as a set. In this application imaging arrays 210s, 210v and the four BLC corner sub-arrays 240a, 240b, 240c and 240d comprise the entire active array and are meant to be included together whenever the term active array is used within the herein provided claims.

Vertical shading related to the difference in accumulated dark current from the uppermost rows of imaging arrays 210s and 210v and the lowermost rows of arrays 210s and 210v may be compensated for by recording and modelling the dark levels of rows 220 and 230 and applying appropriate corrections to the image data recorded by the rows of arrays 210s and 210v. However, in one embodiment an improved method utilizes the invented additional BLC corner sub-arrays, comprised of pixels covered with opaque shields, to more accurately correct for vertical and horizontal shading related to the difference in accumulated dark current across the arrays 210s and 210v. The improved array design and method amounts to a two dimensional shape correction for Black Level Compensation resulting in improved image fidelity. Another embodiment of the invention may combine data from either or both of BLC rows 220 and 230 with that from BLC corner sub-arrays 240a, 240b, 240c and 240d. The use of additional rows and columns such as Dummy Rows (Dum Rows) 250 and 260 and Border Rows (Extra Active Border Rows) 270 and 280 may be used in addition to the BLC rows and BLC corner sub-arrays in order to improve the resultant imaging quality but the addition of the BLC corner sub-arrays and the associated method of black level compensation represent the key inventive features.

In one embodiment of the invention pixel array 210s is 4224x3168 pixels (4:3), pixel array 210v is 4576x2574 pixels (16:9) and the BLC corner sub-arrays are 176x297 pixels. All of these arrays fit within an overall active array of 4576x3168 pixels.

More generally the size of each of the four corner sub-arrays is 0.036 W×0.055 H, wherein W is the width of the active pixel array, and H is the height of the active pixel array.

The invented image sensor with black level compensation and method relies on applying a real time correction to each frame of collected image data to account for the variation in dark current vertically down the rows and across the columns of the active imaging array. Following the capture of a frame of imaging data, that is capturing all the collected charges from all the pixels of the image sensor array, the invented image sensor and method is used to create a black level compensation and adjustment algorithm. In one embodiment the BLC algorithm can be as simple as a linear extrapolation between the imaging signal row averages of the top rows 220 of master array 205, those covered to exclude incident light, and the imaging signal row averages of the bottom rows 230 of master array 205, which are also covered to exclude incident light. In this way the BLC adjustment values for the active array rows are inferred from the measured dark level charges accumulated by the covered rows.

Figure 3:
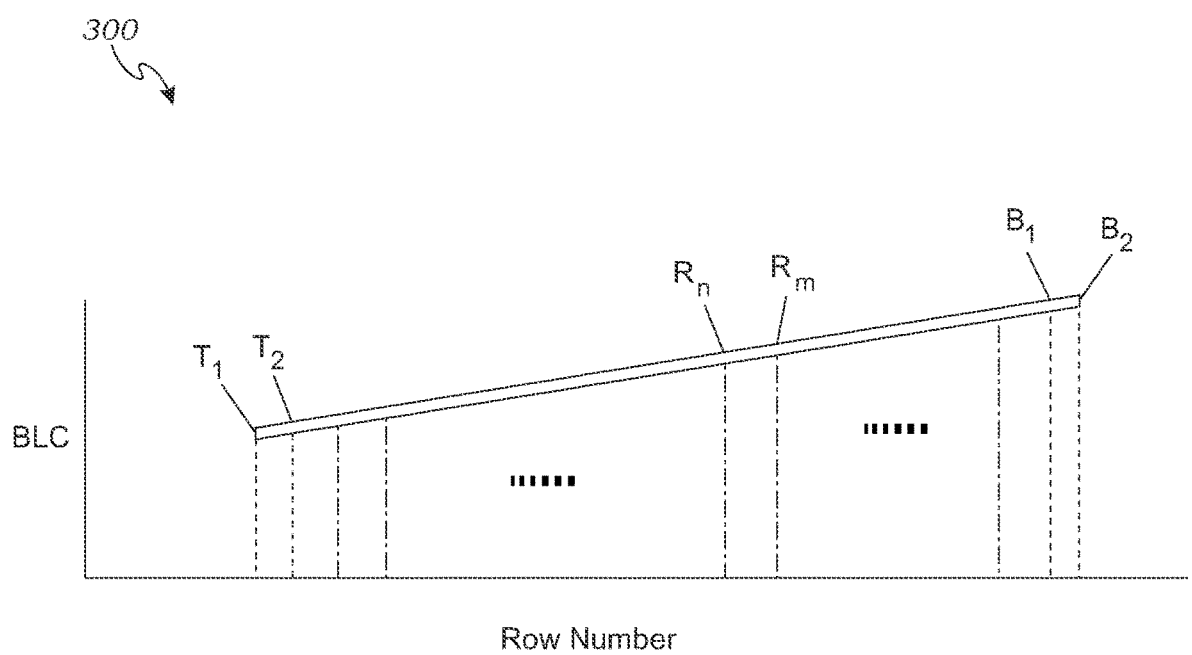
FIG. 3 illustrates a sample algorithm model for use in applying black level compensation.

FIG. 3 shows a plot 300 which illustrates such an algorithm obtained by linear extrapolation of the dark current signal portion $T_1$ and $T_2$ from top rows 220 of FIG. 2 to dark current signal portion $B_1$ and $B_2$ from bottom rows 230 of FIG. 2. The values of compensation to be applied to each of the interceding rows of active arrays 210s or 210v of FIG. 2, of which rows Rn and Rm are illustrative, are provided by the algorithm by simple extrapolation based on their row number or position between the top and bottom rows. The BLC algorithm may be more sophisticated curves or relationships should there be a design requirement or experimental observation to warrant it.

Figure 4:
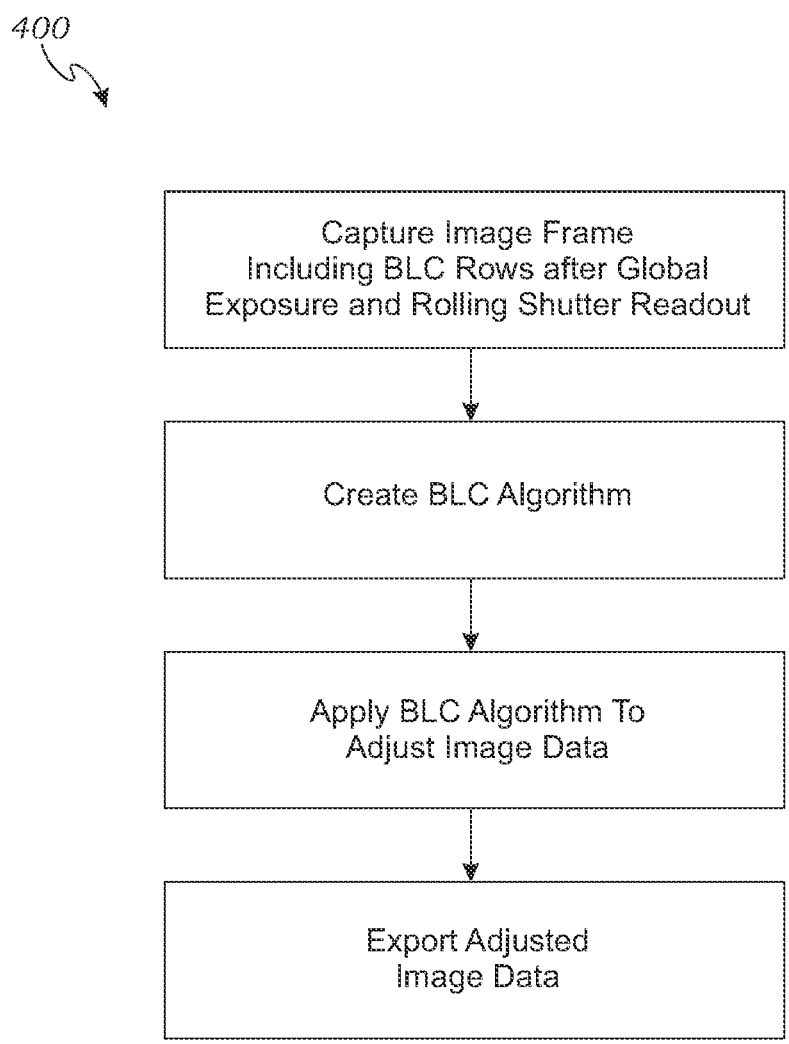
FIG. 4 illustrates one generic method according to the invention to provide black level correction to captured images.

FIG. 4 illustrates the invented Black Level Compensation method as generic block diagram 400. Step 1 involves use of the invented image sensor array with its covered rows to capture a frame of imaging signal incident upon the array after a global exposure and rolling shutter readout. Step 2 consists of creating a BLC algorithm by for example extrapolating between the row averages of the top and bottom covered rows for all the intervening active imaging rows. Step 3 consists of applying the BLC algorithm generated adjustment factors to the appropriate rows of the stored frame of active image signals, and Step 4 consists of exporting the compensated imaging data frame. The BLC algorithm adjustments may more practically be applied after the image signal has processed through digital conversion in an ADC module but any other method may be employed to implement the invented sensor and method. An on image sensor digital signal processing (DSP) unit may be employed to perform the algorithm generation and signal adjustments or an off chip or stacked chip DSP may be employed.

In one embodiment, the original image signal $D_{adc}$ output from the analog to digital converter circuit is described by the following formula:

$$D_{adc}=D_r+B_r+\Delta_r;$$

wherein Dr is the real image signal; Br is the background noise signal; $\Delta r$ is the charge loss signal from sampling to readout, which is proportional to the time difference from sampling to readout.

The black level compensation values for each row of the topmost and bottommost rows, as well as for the sub-arrays is obtained by the following formula:

$$BLC=D_{adc(blc)}=0+B_r+\Delta_r=B_r+\Delta_r;$$

In an embodiment where only the topmost and bottommost BLC rows are used, the real image signal is restored by separately performing linear compensation on each row through the black level compensation curve according to the following formula:

$$D_r=D_{adc}\text{-BLC}(y);$$

wherein, Dr is the real image signal, $D_{adc}$ is the original image signal output from the analog to digital converter circuit, and BLC(y) is the black level compensation value of pixel row(y).

In one embodiment, the black level compensation value of the pixel row(y) is obtained through interpolation by the following formula:

$$BLC(y)=\text{BLCtop}+\Delta K*y;$$

$$\Delta K=(\text{BLCbtm-BLCtop})/\text{VSIZE};$$

wherein $\Delta K$ is the slope of the black level compensation curve, and BLCtop is the black level compensation values of the topmost rows; BLCbtm is the black level compensation values of the bottommost rows, and VSIZE is the longitudinal size of the image acquisition array.

In other embodiments the BLC adjustments may be applied in the analog circuitry through feedback to the analog exposure control or analog gain control circuits. However, the signal transition between the covered BLC rows and the active array rows may cause image jump or color correction anomalies after the initial image frame is captured. In this instance the methodology may be modified to initially capture the slope of the BLC algorithm curve and hold it for application to further frames. In another method the BLC measured values at the top and bottom of an initial frame are combined with the top row value of a following frame to estimate the bottom row value of the following frame. In one embodiment, the bottom row value $BLC_{btm}$ of the following frame is obtained by the following formula:

$$BLC_{btm}=\frac{BLC'_{btm}-BLC'_{top}}{BLC'_{top}}*BLC_{top};$$

wherein $BLC_{top}$ is the top row value of the following frame; $BLC'_{top}$ is the top row value of the initial frame; and $BLC'_{btm}$ is the bottom row value of the initial frame. These alternate methods address the possibility of image jump while exposure or gain adjustments are employed to compensate for black level variation.

Figure 5:
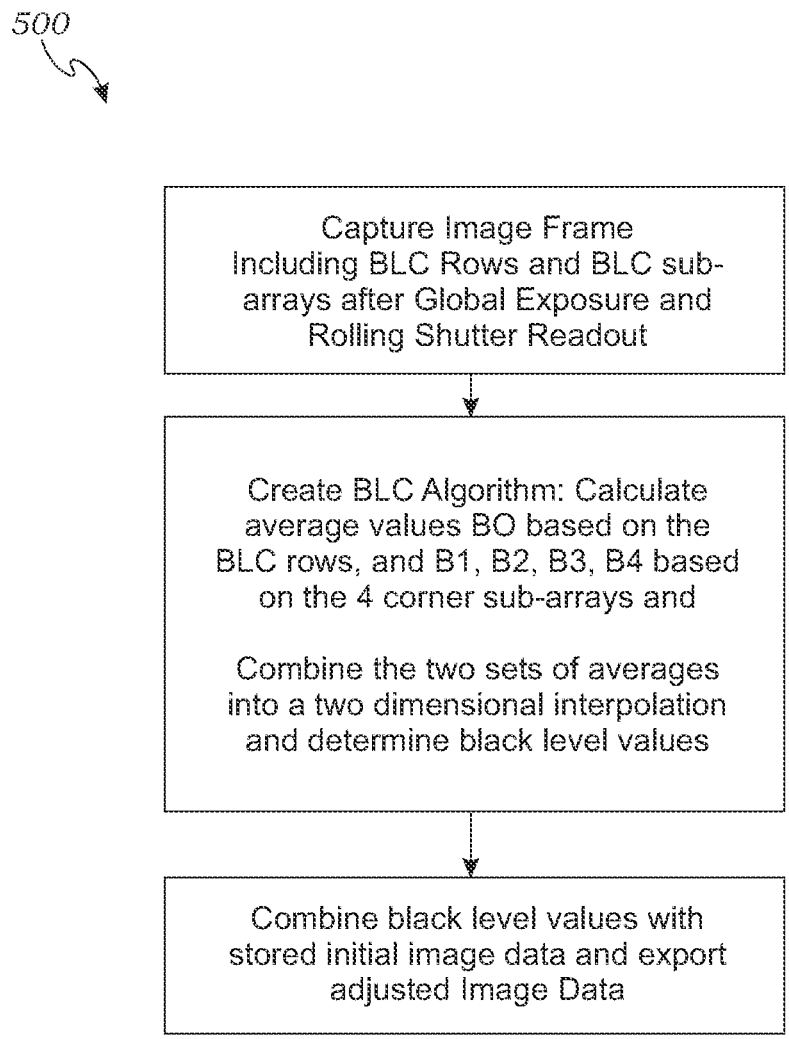
FIG. 5 illustrates a method according to an embodiment of the invention to provide black level correction to captured images where the method includes data from black level compensation corner sub-arrays.

FIG. 5 illustrates a method according to an embodiment of the invention to provide black level correction to captured images where the method includes data from black level compensation corner sub-arrays as a generalized block diagram 500. Step 1 involves use of the invented image sensor array with its covered rows and sub-arrays of pixels to capture a frame of imaging signal incident upon the array after a global exposure and rolling shutter readout. Step 2 consists of creating a BLC algorithm by first calculating average values B0 based on the BLC rows, and average values B1, B2, B3, B4 based on the four corner sub-arrays and then combining the two sets of averages into a two dimensional interpolation and determining black level values. The Step 2 combination may include for example extrapolating between the row averages of the top and/or bottom covered rows and/or by using a weighted average of the corner sub-arrays to determine BLC factors for all the intervening active imaging rows. Step 3 consists of applying the BLC algorithm generated adjustment factors to the appropriate rows of the stored frame of active image signals and export the compensated imaging data frame.

One example of combining the two sets of averages into a two dimensional interpolation is to use Bilinear Interpolation which is a resampling method that in this case uses the distance weighted average of the four nearest average sub-array values to estimate a new sub-array value. In the case of using the top BLC row only to calculate B0 and the four corner BLC sub-arrays the calculation is as follows:

$$B\_Ave = B0*w + [(B1+B2+B3+B4)/4]*(1-w)$$

$$B1' = B4 - (B1+B2+B3+B4)/4$$

$$B2' = B4 - (B1+B2+B3+B4)/4$$

$$B3' = B4 - (B1+B2+B3+B4)/4$$

$$B4' = B4 - (B1+B2+B3+B4)/4$$

$$B\_Delta\ (x,y) = BilinearInterpolation(B1', B2', B3', B4', x, y)$$

$$P(x,y)' = P(x,y) - B\_Ave - B\_Delta\ (x,y)$$

wherein w is a weight threshold based on the size of the active pixel array and x, y are the coordinates of the pixels within the active pixel array.

In one embodiment when the five average values (one BLC row and four BLC corner sub-arrays) do not exceed a certain threshold, or for example the temperature of the sensor does not exceed a certain value, the average value of the black power of the five areas is averaged, and the pixel value of each position point minus the average value provides the final pixel value. Or, the B1' B2' B3' B4' could be 0, and the B_Delta (x,y) could be 0, so P(x,y)'=P(x,y)-B_Ave.

When the five average values exceed a certain threshold, or for example the temperature of the sensor exceeds a certain value, through bilinear interpolation (X/Y direction) of the four corners, the pixel value of each position minus the black level determined by bilinear interpolation provides the final pixel value. That is, P(x,y)'=P(x,y)-B_Ave-B_Delta (x,y).

The BLC algorithm adjustments may more practically be applied after the image signal has processed through digital conversion in an ADC module but any other method may be employed to implement the invented sensor and method. An on image sensor digital signal processing (DSP) unit may be employed to perform the algorithm generation and signal adjustments or an off chip or stacked chip DSP may be employed.

In still another embodiment of the invention in the case when the digital backend gain is large the linear compensation algorithm may cause a line defect to be noticeable. In this case an embodiment of the invention will further add low-bit random numbers to the BLC algorithm curve.

In one embodiment, the adjusted real image signal Dr' is obtained by the following formula:

$$Dr' = Dadc - BLC(y) + Random;$$

wherein $D_{adc}$ is the original image signal output from the analog to digital converter circuit; BLC(y) is the black level compensation value of pixel row(y); and Random is the low-bit random numbers. In this case the image data for each pixel of each row of the original image data is not completely consistent and the then defects no longer fall in the same row thus blurring out the defect artifact. The quality of the resultant image is improved with this and the other Black Level Compensation measures and methods.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An image sensor with image black level compensation, comprising:
    a master array of imaging pixels to generate analog image signals, wherein each pixel includes a photodiode that generates charge in response to incident light as well as dark current charge independent of incident light, and wherein the imaging pixels are arranged in a plurality of rows and columns;
    an active array of imaging pixels within said master array of imaging pixels wherein the active array is circumscribed by a field of focus of an imaging lens positioned above the array of imaging pixels to focus incident light on the active array of imaging pixels;
    four sub-arrays of pixels each located in one of the four corners of the active array of imaging pixels wherein there are opaque shields above their photodiodes to prevent the generation of incident light related charge and wherein these corner sub-arrays provide for the generation of black level compensation analog image signals and wherein no other pixels of the active array have opaque shields and provide for the generation of black level compensation analog image signals;

an analog to digital converter circuit coupled to an array image signal output circuit to digitize the analog image signals; and a black level compensation generating circuit for generating an algorithm derived from the signals acquired from the four corner sub-arrays of pixels wherein application of the algorithm to the digitized image signals from the active array compensates for black level variation among the pixels of the active array.

2. The image sensor with image black level compensation of claim 1, wherein the four sub-arrays of pixels located in the four corners of the active array of imaging pixels are positioned so as to be partially inside and partially outside the field of focus of an imaging lens positioned above the array of imaging pixels to focus incident light on the active array of imaging pixels.

3. The image sensor with image black level compensation of claim 1, wherein the four sub-arrays of pixels located in the four corners of the active array of imaging pixels are positioned so as to be wholly inside the field of focus of an imaging lens positioned above the array of imaging pixels to focus incident light on the active array of imaging pixels.

4. The image sensor with image black level compensation of claim 1, wherein the black level compensation circuit includes a random number adding circuit to adjust the algorithm generated values for each pixel of the active array randomly in order to reduce image visual display anomalies.

5. The image sensor with image black level compensation of claim 1, wherein each of the corner sub-arrays of pixels has a width in pixels equivalent to 0.036 times the width of the active array in pixels and has a height in pixels equivalent to 0.055 times the height of the active array in pixels.

6. The image sensor with image black level compensation of claim 1, wherein the active array of pixels is 4576 pixels by 3168 pixels and can be partitioned into an array with 4 to 3 ratio of 4224 pixels by 3168 pixels for still image capture or an array with 16 by 9 ratio of 4576 pixels by 2574 pixels for video image capture.

7. The image sensor with image black level compensation of claim 6, wherein each of the corner sub-arrays of pixels is 176 pixels by 297 pixels.

8. A method to compensate for black level variation among the pixels of an active array of pixels of an image sensor array, the method comprising the following steps:

providing a master array of imaging pixels to generate analog image signals, wherein each pixel includes a photodiode that generates charge in response to incident light as well as dark current charge independent of incident light, and wherein the imaging pixels are arranged in a plurality of rows and columns;

providing an active array of imaging pixels within said master array of imaging pixels wherein the active array is circumscribed by a field of focus of an imaging lens positioned above the array of imaging pixels to focus incident light on the active array of imaging pixels;

providing four sub-arrays of pixels located in the corners of the active array of imaging pixels whereupon there are opaque shields above their photodiodes to prevent the generation of incident light related charge and wherein these corner sub-arrays provide for the generation of black level compensation analog image signals;

providing an analog to digital converter circuit coupled to an array image signal output circuit to digitize the analog image signals; and providing a black level compensation generating circuit for generating and applying an algorithm for compensating for black level variation among the rows of the array through the following steps:

first read and digitize and store a frame of the imaging signals from all the rows of the master array including the four corner pixel sub-arrays;

second generate a black level compensation algorithm based on the average values B1, B2, B3, B4 of the pixel dark current values of the four corner pixel sub-arrays; and third combine the black level compensation values generated by the black level compensation algorithm for each pixel of the active imaging array with the stored frame of digitized image signals matching the pixels of the active imaging array and export the adjusted image data.

9. The method to compensate for black level variation of claim 8, wherein the black level compensation algorithm may be determined from an initial frame and held for application to further frames.

10. The method to compensate for black level variation of claim 8, wherein to the digitized black level compensation image signal values low-bit random numbers are added to the black level compensation algorithm such that visual defects no longer fall in the same pixel thus blurring out the visual impact of the defect artifact.

11. The method to compensate for black level variation of claim 8, wherein the black level compensation image signal values are transformed into feedback to the analog exposure control or analog gain control circuits wherein related adjustments provide the reduced image display shading.

12. A method to compensate for black level variation among the pixels of an active array of pixels of an image sensor array, the method comprising the following steps:

providing a master array of imaging pixels to generate analog image signals, wherein each pixel includes a photodiode that generates charge in response to incident light as well as dark current charge independent of incident light, and wherein the imaging pixels are arranged in a plurality of rows and columns;

providing an active array of imaging pixels within said master array of imaging pixels wherein the active array is circumscribed by a field of focus of an imaging lens positioned above the array of imaging pixels to focus incident light on the active array of imaging pixels;

providing a small number of the topmost rows of the master array which have opaque shields above their photodiodes to prevent the generation of incident light related charge and wherein these rows provide for the generation of black level compensation analog image signals;

providing four sub-arrays of pixels located in the corners of the active array of imaging pixels whereupon there are opaque shields above their photodiodes to prevent the generation of incident light related charge and wherein these corner sub-arrays provide for the generation of black level compensation analog image signals;

providing an analog to digital converter circuit coupled to an array image signal output circuit to digitize the analog image signals; and providing a black level compensation generating circuit for generating and applying an algorithm for compensating for black level variation among the rows of the array through the following steps:

first read and digitize and store a frame of the imaging signals from all the rows of the master array including the topmost rows and the four corner pixel sub-arrays;

second generate a black level compensation algorithm based on the average value B0 of the pixel dark current values of the topmost rows of the master array and additionally based on the average values B1, B2, B3, B4 of the pixel dark current values of the four corner pixel sub-arrays; and third combine the black level compensation values generated by the black level compensation algorithm for each pixel of the active imaging array with the stored frame of digitized image signals matching the pixels of the active imaging array and export the adjusted image data.

13. The method to compensate for black level variation of claim 12, wherein the number of topmost rows is two.

14. The method to compensate for black level variation of claim 12, wherein the black level compensation algorithm based on combining the two sets of averages into a two-dimensional interpolation by the use of Bilinear Interpolation which is a resampling method that in this case uses the distance weighted average of the four nearest average sub-array values to estimate a new sub-array value, wherein top BLC row average is B0 and the four corner BLC sub-array averages are B1, B2, B3 and B4 and the algorithm is as follows:

$B\_Ave = B0*w + [(B1+B2+B3+B4)/4]*(1-w)$ $B1' = B1 - (B1+B2+B3+B4)/4$ $B2' = B2 - (B1+B2+B3+B4)/4$ $B3' = B3 - (B1+B2+B3+B4)/4$ $B4' = B4 - (B1+B2+B3+B4)/4$ $B\_Delta(x,y) = BilinearInterpolation(B1', B2', B3', B4', x, y)$ $P(x,y)' = P(x,y) - B\_Ave - B\_Delta(x,y)$ wherein w is a weight threshold based on the size of the active pixel array and x, y are the coordinates of the pixels within the active pixel array.

15. The method to compensate for black level variation of claim 12, wherein the black level compensation algorithm may be determined from an initial frame and held for application to further frames.

16. The method to compensate for black level variation of claim 12, wherein to the digitized black level compensation image signal values low-bit random numbers are added to the black level compensation algorithm such that visual defects no longer fall in the same pixel thus blurring out the visual impact of the defect artifact.

17. The method to compensate for black level variation of claim 12, wherein the black level compensation image signal values are transformed into feedback to the analog exposure control or analog gain control circuits wherein related adjustments provide the reduced image display shading.

* * * * *